United States Patent
Beck

(10) Patent No.: US 6,986,241 B2
(45) Date of Patent: Jan. 17, 2006

(54) ROTARY CONVEYOR WITH FINGERS

(75) Inventor: Folker Beck, Bettendorf, IA (US)

(73) Assignee: Deere & Company, Moline, IL (US)

( * ) Notice: Subject to any disclaimer, the term of this patent is extended or adjusted under 35 U.S.C. 154(b) by 74 days.

(21) Appl. No.: 09/943,226

(22) Filed: Aug. 29, 2001

(65) Prior Publication Data

US 2002/0025840 A1 Feb. 28, 2002

(30) Foreign Application Priority Data

Aug. 30, 2000 (DE) .......................... 100 42 499

(51) Int. Cl.
*A01D 89/00* (2006.01)

(52) U.S. Cl. ......................... 56/364; 56/12.4
(58) Field of Classification Search ................... 56/364, 56/12.4, 14.3, 16.1; 460/16
See application file for complete search history.

(56) References Cited

U.S. PATENT DOCUMENTS

| | | | |
|---|---|---|---|
| 675,418 A | 6/1901 | Shavlande | |
| 1,016,740 A | * 2/1912 | Ellison | ........................ 198/310 |
| RE21,571 E | * 9/1940 | Innes | ........................... 56/364 |
| 2,748,921 A | * 6/1956 | White | ........................ 198/518 |
| 2,755,912 A | 7/1956 | Ashton | ........................ 198/104 |
| 4,297,760 A | 11/1981 | Olivari | ........................... 15/79 |

FOREIGN PATENT DOCUMENTS

| | | |
|---|---|---|
| DE | 2 103 981 | 9/1972 |
| DE | 32 11 177 A1 | 10/1982 |
| DE | 198 03 336 A1 | 8/1999 |
| EP | 0 235 106 A2 | 9/1987 |
| EP | 0 567 192 A1 | 10/1993 |
| FR | 1 495 238 | 12/1967 |
| FR | 2 792 469 | 10/2000 |
| GB | 612962 | 11/1948 |
| GB | 1151119 | 5/1969 |

OTHER PUBLICATIONS

Database WPI Section PQ, Week 198828, Derwent Publications Ltd., London, GB; Class P12, AN 1988–196613 XP002183178 & SU 1 360 685 A (Sarat Agric Mech), Dec. 23, 1987.

* cited by examiner

*Primary Examiner*—Robert E. Pezzuto
*Assistant Examiner*—Meredith C. Petravick

(57) ABSTRACT

A rotary conveyor comprises a rotatable drum-shaped shell, an eccentric axle located in the drum-shaped shell, finger supports mounted to the eccentric axle, and a plurality of fingers mounted to the finger supports that extend outwardly through openings in the drum-shaped shell. The finger supports are rotatively mounted to and spaced radially outward from the eccentric axle by annular bearings. The finger supports are parallel to the eccentric axle and are provided with a plurality of fingers, such that several fingers arranged next to one another in the axial direction are attached to finger supports. The finger supports are distributed around the circumference of the eccentric axle.

12 Claims, 3 Drawing Sheets

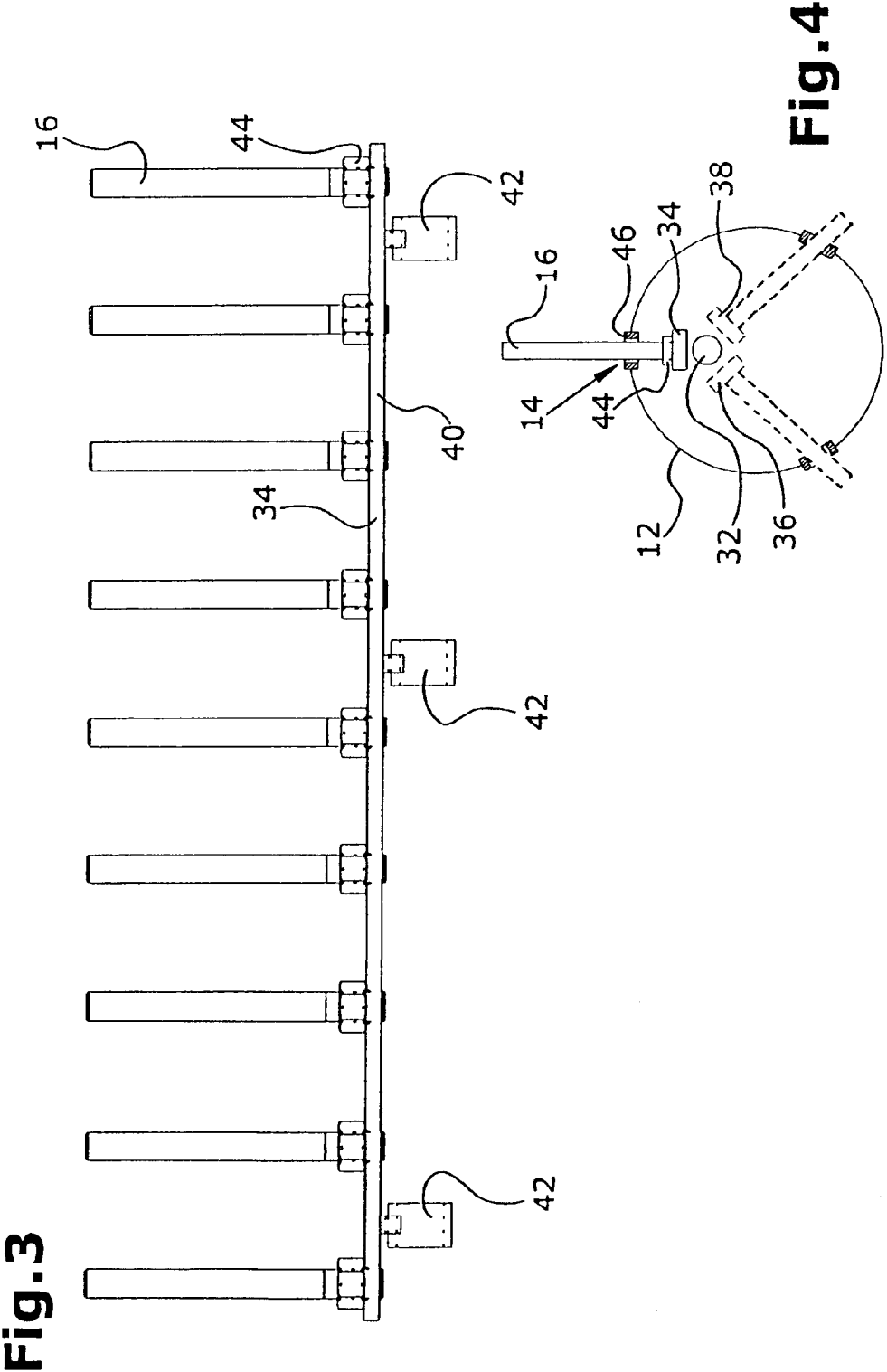

US 6,986,241 B2

ROTARY CONVEYOR WITH FINGERS

FIELD OF THE INVENTION

The present invention is directed to a rotary conveyor comprising a rotatable drum-shaped shell, a stationary eccentric axle arranged inside the shell, and a plurality of fingers arranged on finger supports that are rotatively mounted to the eccentric axle. The fingers extend through openings in the shell, such that several fingers are arranged next to one another in the axial direction.

BACKGROUND OF THE INVENTION

U.S. Pat. No. 675,418 A discloses a rotary conveyor having a drum-shaped shell with fingers extending through openings in the shell. The fingers are mounted and can rotate on an eccentric, fixed axle, so that the length by which the fingers project out of the shell depends on the rotation position of the rotating shell which carries the fingers along with it as it turns. On the axle, four groups of fingers are arranged axially alongside one another, each group having three fingers, one of which in each case passes through one of three openings distributed around the circumference of the shell at an offset of 120° from the others. The fingers of each group are separately pivoted on the axle, and for this U-shaped sheet components with holes through which the axle passes are provided.

A similar rotary conveyor is disclosed in GB 612 962 A. Several fingers in one group are pivotally mounted on collars, except for one finger which is solidly attached so as to carry the collar around as the shell rotates. The remaining fingers are hinged to the collar so that they can swivel separately.

GB 1 151 119 A discloses a rotary conveyor, in which pairs of adjacent fingers are attached to a sleeve and the holders are pushed onto and can rotate around the eccentric axle.

DE 2 103 981 A discloses a rotary conveyor arranged over the straw walkers of a combine harvester to improve the separation of residual grains from the threshed crop, in which elastic prongs are guided on a curved track.

DE 31 11 177 A describes a rotary conveyor with two diametrically opposed groups of fingers. The fingers are arranged on axially orientated crossbars, which can swivel about an axle displaced from the fingers in the rotation direction and orientated parallel to the longitudinal axis of the rotary conveyor. The angular position of the crossbars is controlled by connecting rods connected to a fixed axle.

For conveying harvested crops, under certain circumstances it is desirable to have drum conveyors with as many fingers as possible, for example in the middle of transversely extending augers of harvesting platforms or in conveyors positioned above the straw walkers of combine harvesters. When the holders of the fingers are arranged next to one another in the axial direction on the eccentric axle, as in the case of GB 1 151 119 A, the number of fingers is limited by the width of the holders. The arrangement disclosed in U.S. Pat. No. 675,418 A allows a larger number of fingers, but has the disadvantage that replacement of a holder that has become defective entails dismantling the conveyor completely, which is a very time-consuming and therefore expensive process. In GB 612 962 A fingers are also arranged in a star, but almost every finger is associated with its own rotating attachment to the holder also fitted onto and pivoting around the axle, which results in a relatively expensive structure. The curved track to control prongs disclosed in DE 2 103 981 A and the control via connecting rods proposed in DE 32 11 177 A are, in contrast, essentially of a more complex design than when the fingers are fitted to an eccentric shaft.

SUMMARY OF THE INVENTION

It is an object of the present invention to provide a drum conveyor of simple construction that can be provided with a large number of fingers.

The invention relates to a rotary conveyor comprising a rotatable drum-shaped shell, a stationary eccentric axle located in the drum-shaped shell, finger supports mounted to the eccentric axle, and fingers mounted to the finger supports that extend outwardly through openings in the drum-shaped shell. The finger supports are rotatively mounted on the eccentric axle. The shell can be rotated by means of a drive system in order to convey material, while the axle is typically held in a stationary, non-rotating position relative to the drum-shaped shell. It is also conceivable, however, to design the eccentric axle too as a rotating component so that the conveying behavior of the rotary conveyor can be varied. The shell carries the fingers located in the openings around the eccentric axle as the shell rotates. The length by which the fingers project out of the shell depends on the angular position of the axle because of its eccentricity. The invention proposes that several finger supports should be distributed in the circumferential direction. This ensures that in at least one axial position of the axle there will be at least two finger supports with fingers attached to them in different angular positions.

Owing to the fact that several finger supports with different rotation angles are associated with one position of the axle, the number of fingers that can be attached to the axle can be increased with little complexity and expense. This improves the conveying action of the rotary conveyor.

Preferably, the finger supports are distributed around the axle not just in one position, but over a portion of the width of the drum-shaped shell corresponding at least to the distance between two fingers arranged next to one another in the axial direction. To enable the rotary conveyor to be provided with the largest possible number of fingers, it is preferable for the finger supports to be distributed around the axle over that portion of the width of the shell which is provided with fingers.

The finger supports can be arranged offset from one another in the axial direction. This makes it possible to use finger supports of the same type, which is advantageous from the standpoint of production and storage; owing to their axial offset, they can be mounted on the axle at various points. As a rule, the fingers are then also offset in the axial direction. If respective groups of fingers are to have the same axial position, then similar axially offset finger supports can be used which have several finger attachment points offset in the axial direction, with only some of the said attachment points actually fitted with fingers. Alternatively, different finger supports or ones fitted on the axle in the reverse direction are used, such that the fingers of one group all adopt the same axial position.

To attach the finger supports to the axle, annular bearings are used which surround the axle. As a rule each finger support comprises several such bearings spaced axially apart. The elements may be of the permanently closed type and are then pushed onto the axle. To facilitate the replacement of a defective finger support, however, it is preferable for the elements to be of a clam shell design that can be opened and removed from the axle in a radial direction, without having to dismantle the rotary conveyor.

To reduce the number of structural elements making up the rotary conveyor, the length of the finger supports can be chosen such that they extend essentially over the full width of the shell (or the portion of it provided with fingers). It is also conceivable, however, to arrange several shorter finger supports axially next to one another.

During use it is conceivable that the fingers or their supports may become damaged. To be able to continue using the other fingers and/or their supports, the fingers are removably attached to their finger supports. For this, various connections of known type can be used, in particular bayonet attachments. A particularly simple way is to provide the fingers at one end with a screw thread, which can be screwed into a corresponding threaded hole in the finger support. The screw connection can then be secured by a locking nut.

The rotary conveyor of the present invention, is particularly suitable for agricultural use. It can be used with the harvesting platforms of combine harvesters to convey the harvested crop into a feeder house. It can also be used above the straw walkers of a harvester to improve the separation of residual grains.

BRIEF DESCRIPTION OF THE DRAWINGS

FIG. 3 is a side view of a finger support.

FIG. 4 is a cross sectional view through the rotary conveyor.

DETAILED DESCRIPTION

Figure 1:
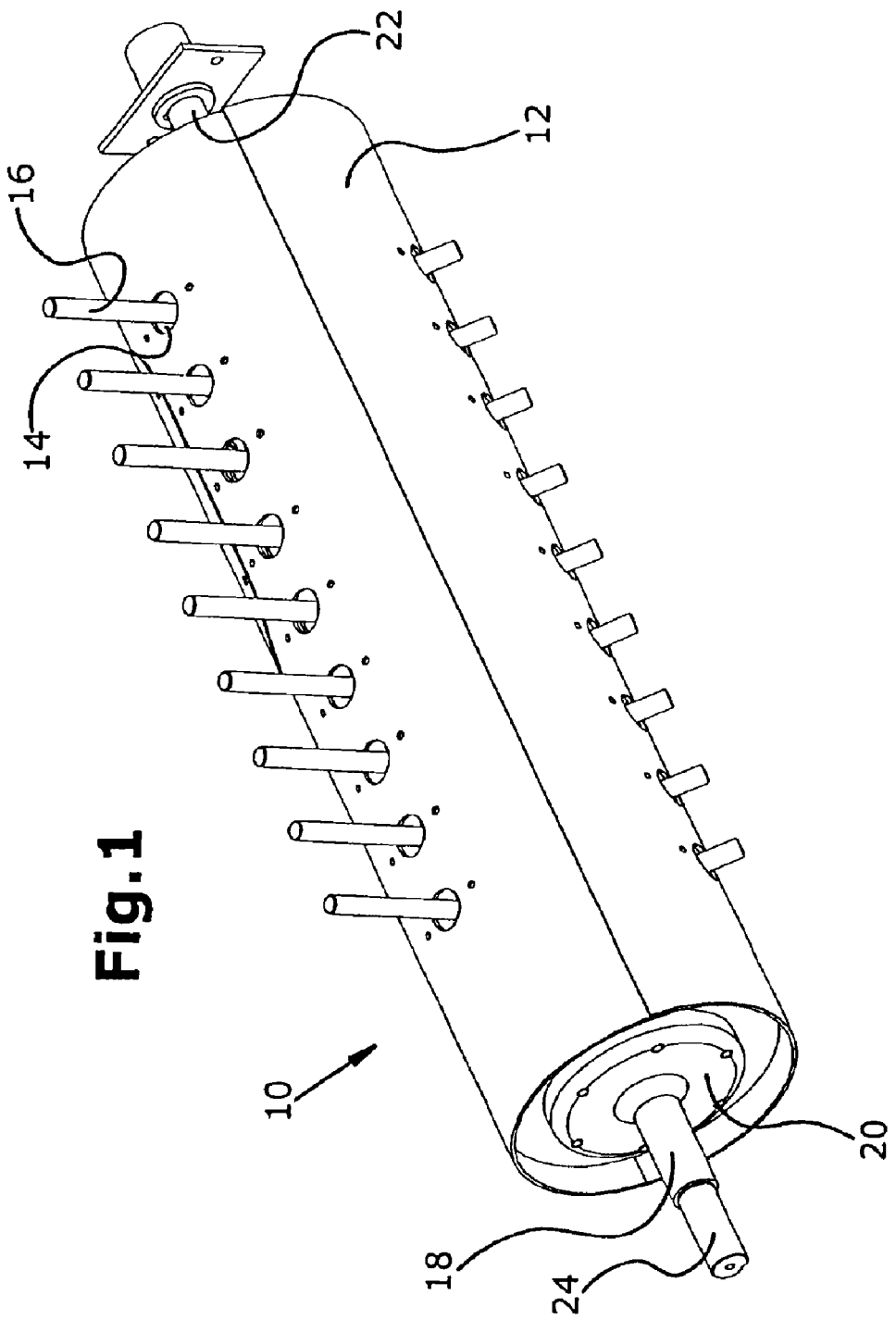
FIG. 1 is a perspective view of a rotary conveyor according to the invention.

The rotary conveyor 10 shown in FIG. 1 comprises a drum-shaped shell 12 over whose length and circumference are distributed three rows of openings 14 offset by 120° relative to one another, through which extend fingers 16. Slide bearings 46 for the fingers 16 can be set into the openings (see FIG. 4), which are not shown in FIG. 1 for the sake of simplicity. The shell 12 can be made to rotate in order to convey material, by a drive system (not shown in FIG. 1) that engages a hollow shaft 18 connected to a flange 20 of the shell 12 with which it rotates. A first axle end 22 on the right of the rotary conveyor 10 is supported by and rotates on a housing. In an identical manner, a second axle end 24 positioned inside the hollow shaft 18 is supported by and rotates on a housing, not shown.

Figure 2:
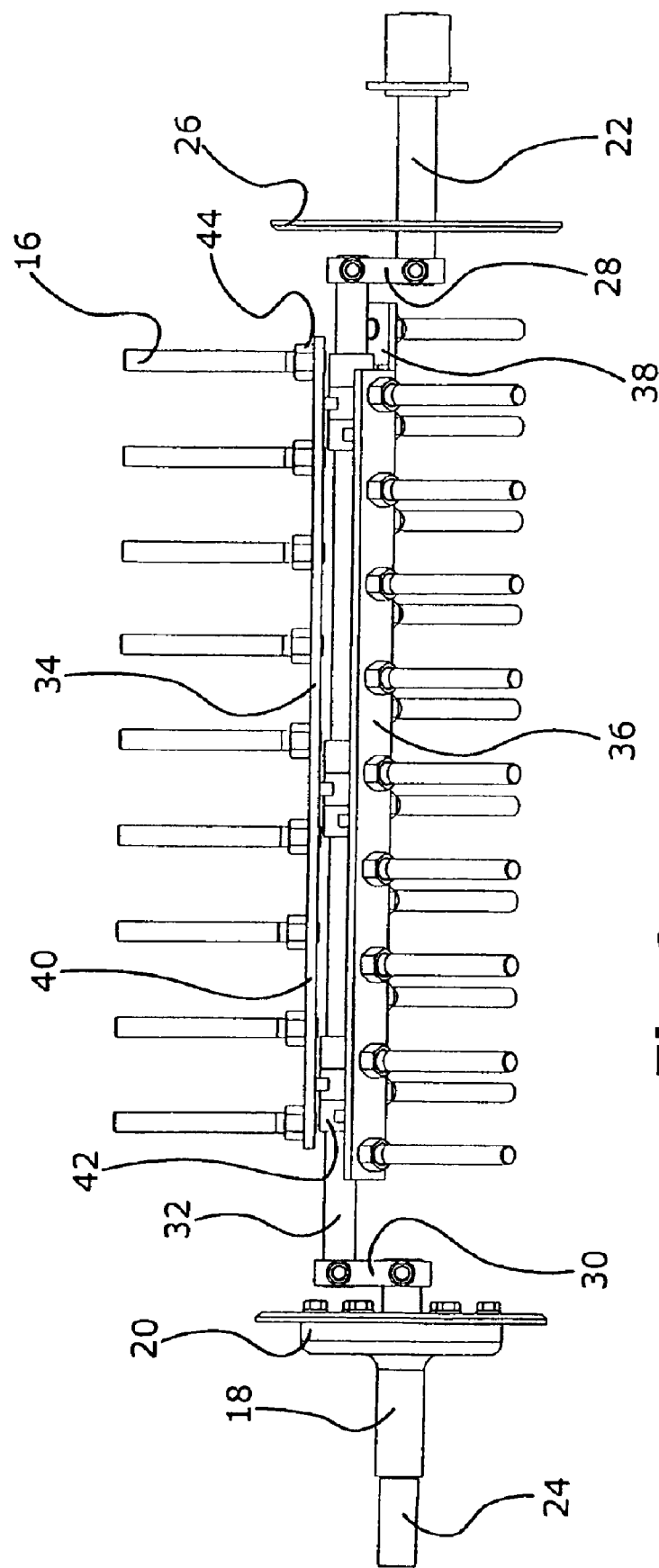
FIG. 2 is a side view of the rotary conveyor of FIG. 1 with its shell removed.

As illustrated in FIG. 2, the right edge of the shell 12 is supported on a disc 26 that is rotatively mounted on the first axle end 22. The left edge of the shell 12 is supported on flange 20 that is rotatively mounted to second axle end 24. Thus, the shell 12 can be rotated on non-rotating axle ends 22 and 24 by the hollow shaft 18.

One end of crank arms 28 and 30 is connected to the axle ends 22 and 24, respectively. Both crank arms 28 and 30 extend at right-angles to the respective axle ends 22 and 24. Between the other ends of the crank arms 28 and 30 extends an axle 32 which runs parallel to the central axis of the shell 12. The axle 32 is eccentric to the central axis of the shell. Three finger supports 34, 36 and 38 are rotatively mounted on the axle 32 by annular bearing 42. The finger supports 34, 36 and 38 extend across that part of the width of the axle 32 which is provided with fingers 16. The finger supports 34, 36 and 38 are identical and are offset by about 120° relative to one another being distributed around the axle 32. The finger supports 34, 36 and 38 are also displaced from one another in the axial direction by the width of annular bearings 42.

The finger supports 34, 36 and 38 comprise a body 40 with rectangular cross-section and three annular bearings 42 which enclose the axle 32. The annular bearings are mounted on the ends and middle sections of the finger support 34, 36 and 38. The annular bearings 42 of the finger supports 34, 36 and 38 are pushed onto the axle 32. Over the length of the finger supports 34, 36 and 38 are distributed fingers 16. The inside end of each the finger 16 is provided with a screw thread which is screwed into a corresponding thread in the body 40. The attachment of the fingers 16 to the body 40 is secured by a locking nut 44.

From FIG. 4 it can be seen that the finger supports 34, 36 and 38 are distributed around the axle 32. When the shell 12 rotates, the fingers 16, which fit and can move in the openings 14 by virtue of slide bearings 46, are carried along with it. Owing to the eccentric position of the axle 32 relative to the shell 12, the length by which the fingers 16 project out of the shell 12 depends on the respective rotary position of the fingers 16.

The use of finger supports 34, 36 and 38 distributed around the eccentric axle 32 makes it possible, in a simple way, to increase the number of fingers 16 of the rotary conveyor 10, which improves the conveying action at any given speed of rotation in an advantageous way.

Having described the preferred embodiment, it will become apparent that various modifications can be made without departing from the scope of the invention as defined in the accompanying claims.

ASSIGNMENT

The entire right, title and interest in and to this application and all subject matter disclose and/or claimed therein, including any and all division, continuations, reissues, etc., thereof are, effective as of the date of execution of this application, assigned, transferred, sold and set over by the applicant(s) named herein to Deere & Company, a Delaware corporation having offices at Moline Ill. 61265, U.S.A., together with all rights to file, and to claim priorities in connection with, corresponding patent applications in any and all foreign countries in the name of Deere & Company or otherwise.

What is claimed is:

1. A rotary conveyor comprising:
  a drum-shaped shell having openings;
  an eccentric axle arranged inside the shell, the eccentric axle defining an axial direction;
  finger supports being rotatively mounted to the eccentric axle, each finger support is rotatively mounted to the eccentric axle by several annular bearings spaced apart in the axial direction along the eccentric axle, the finger supports extend radially outward from and parallel to the eccentric axle;
  a plurality of fingers are mounted to each finger support, the fingers extending through the openings in the drum-shaped shell such that fingers on one finger support are arranged next to one another in the axial direction, the finger supports are distributed around the circumference of the eccentric axle, whereby the finger supports extend axially within a portion of the drum-shaped shell having openings for the fingers.

2. A rotary conveyor as defined by claim 1 wherein that portion of the shell having fingers is provided with three finger supports that are distributed along the eccentric axle.

3. A rotary conveyor as defined by claim 1 wherein the finger supports are offset relative to one another in the axial direction.

4. A rotary conveyor as defined by claim 3 wherein the finger supports are identical to one another.

5. A rotary conveyor as defined by claim 4 wherein the fingers are removably attached to the finger supports.

6. A rotary conveyor as defined by claim 5 wherein the fingers are screwed into threaded openings in the finger supports.

7. A rotary conveyor as defined by claim 6 wherein the fingers are secured on the finger supports by locking nuts.

8. A rotary conveyor comprising:
   a rotatable drum-shaped shell having openings;
   a non-rotating eccentric axle arranged inside the shell, the non-rotating eccentric axle defining an axial direction;
   finger supports being rotatively mounted to the non-rotating eccentric axle, each finger support is rotatively mounted to the non-rotating eccentric axle by at least two axially spaced annular bearings, the finger supports extend radially outward from and parallel to the non-rotating eccentric axle wherein the finger supports are identical to one another and are offset relative to one another in the axial direction;
   a plurality of fingers are mounted to each finger support, the fingers extending through the openings in the drum-shaped shell such that fingers on one finger support are arranged next to one another in the axial direction.

9. A rotary conveyor as defined by claim 8 wherein the fingers are removably attached to the finger supports.

10. A rotary conveyor as defined by claim 9 wherein the fingers are screwed into threaded openings in the finger supports.

11. A rotary conveyor as defined by claim 10 wherein the fingers are secured an the finger supports by locking nuts.

12. A rotary conveyor comprising:
    a rotatable shell having openings;
    a non-rotating eccentric axle arranged inside the shell:
    finger supports being rotatively mounted to the non-rotating eccentric axle, each finger support is rotatively mounted to the non-rotating eccentric axle by at least two bearings axially spaced along the non-rotating eccentric axle, the finger supports extend radially outward from and parallel to the non-rotating eccentric axle, the finger supports being located inside the rotatable shell;
    a plurality of fingers are mounted to each finger support, the fingers extending through the openings in the shell.

* * * * *